(12) United States Patent
Boundy et al.

(10) Patent No.: US 10,852,759 B2
(45) Date of Patent: Dec. 1, 2020

(54) FLEXIBILITY-BASED RANKING OF UTILITY CUSTOMERS FOR DETERMINING CONSTRAINTS ON POWER DEMAND

(71) Applicant: Intel Corporation, Santa Clara, CA (US)

(72) Inventors: David Boundy, Bishopstown (IE); David Relihan, Meath (IE); Michael O'Reilly, Multyfarnham (IE)

(73) Assignee: Intel Corporation, Santa Clara, CA (US)

( * ) Notice: Subject to any disclaimer, the term of this patent is extended or adjusted under 35 U.S.C. 154(b) by 33 days.

(21) Appl. No.: 16/224,852

(22) Filed: Dec. 19, 2018

(65) Prior Publication Data
US 2019/0265741 A1 Aug. 29, 2019

(51) Int. Cl.
| | | |
|---|---|---|
| *G05D 3/12* | (2006.01) | |
| *G05D 5/00* | (2006.01) | |
| *G05D 9/00* | (2006.01) | |
| *G05D 11/00* | (2006.01) | |
| *G05D 17/00* | (2006.01) | |
| *G05F 1/66* | (2006.01) | |
| *G06Q 10/06* | (2012.01) | |
| *H02J 3/14* | (2006.01) | |
| *G06Q 50/06* | (2012.01) | |
| *H02J 3/00* | (2006.01) | |

(52) U.S. Cl.
CPC ......... *G05F 1/66* (2013.01); *G06Q 10/06312* (2013.01); *G06Q 50/06* (2013.01); *H02J 3/14* (2013.01); *H02J 3/003* (2020.01)

(58) Field of Classification Search
CPC ............... G05F 1/16; G06Q 50/06; H02J 3/14
USPC ......................................................... 700/291
See application file for complete search history.

(56) References Cited

U.S. PATENT DOCUMENTS

| | | | | |
|---|---|---|---|---|
| 2006/0030972 A1* | 2/2006 | Schlueter | ................. | H02J 3/00 700/292 |
| 2010/0292856 A1* | 11/2010 | Fujita | ..................... | G06Q 10/04 700/291 |
| 2011/0035073 A1* | 2/2011 | Ozog | ............... | G06Q 10/06315 700/291 |
| 2013/0245849 A1* | 9/2013 | Paul | ......................... | G06F 1/26 700/295 |

(Continued)

OTHER PUBLICATIONS

O'Connell, S. et al., "Flexibility Analysis for Smart Grid Demand Response", Published in ArXiv, 2017. 7 pages.

*Primary Examiner* — Md Azad
(74) *Attorney, Agent, or Firm* — Green, Howard & Mughal LLP

(57) ABSTRACT

Techniques and mechanisms for determining constraints to be imposed on resource utilization by customers of an electric utility. In an embodiment, flexibility metrics are determined each for a different respective customer, the flexibility metrics each indicating a respective difference between a metric of resource utilization, and a respective constraint which is imposed on that resource utilization. The customers are ranked, relative to one another, based on the flexibility metrics, where the ranking is used as a basis for selecting one or more customers to accommodate a change to a power delivery service of the electric utility. In another embodiment, one or more updated utilization constraints are imposed each by a respective customer of one or more selected customers.

19 Claims, 9 Drawing Sheets

(56) References Cited

U.S. PATENT DOCUMENTS

2014/0222225 A1\* 8/2014 Rouse ................... G06Q 10/04
700/291
2016/0086199 A1\* 3/2016 Edmonds ........... G06Q 30/0202
705/7.31

\* cited by examiner

210

211 Based on a parameter $uc_{x:1}$, constraining a resource utilization to accommodate a power service plan PP1

212 Communicating an indication of a flexibility metric $f_{x:1}$ which is based on both a metric of the resource utilization and the parameter $uc_{x:1}$

213 Receiving an indication of a parameter $uc_{x:2}$

214 Based on the parameter $uc_{x:2}$, constraining a resource utilization to accommodate power service plan PP2

FIG. 2B

FLEXIBILITY-BASED RANKING OF UTILITY CUSTOMERS FOR DETERMINING CONSTRAINTS ON POWER DEMAND

BACKGROUND

1. Technical Field

Embodiments of the invention relate generally to power demand management and more particularly, but not exclusively, to constraining power demand by customers of a utility.

2. Background Art

Power distribution infrastructure for residential, commercial, and industrial customers has traditionally been energized by large, centralized power generation facilities. More recently, such infrastructure (i.e., the "electric grid" or "grid") has been supplemented by various forms of distributed energy generation facilities such as gas turbines, diesel generators, and renewable technologies such as wind and solar.

It is increasingly necessary, in various use cases, to provide more efficient management of the electrical supply through a grid, from both centralized and distributed generation sources, to meet various regulatory and/or commercial demands. For example, the energy sector has begun to support, or been compelled to support, so-called "Demand Response" functionality wherein electrical load is selectively shed or added to an energy grid, at various times, based on end-user demand and the level of currently-available electricity generation. As Demand Response solutions continue to proliferate, there is expected to be an increasing premium placed on incremental improvements in how power loading is to be increased or decreased.

BRIEF DESCRIPTION OF THE DRAWINGS

The various embodiments of the present invention are illustrated by way of example, and not by way of limitation, in the figures of the accompanying drawings and in which:

FIG. 2B is a flow diagram illustrating elements of a device, according to an embodiment, for constraining utilization of a power service provided by a utility.

DETAILED DESCRIPTION

Figure 1:
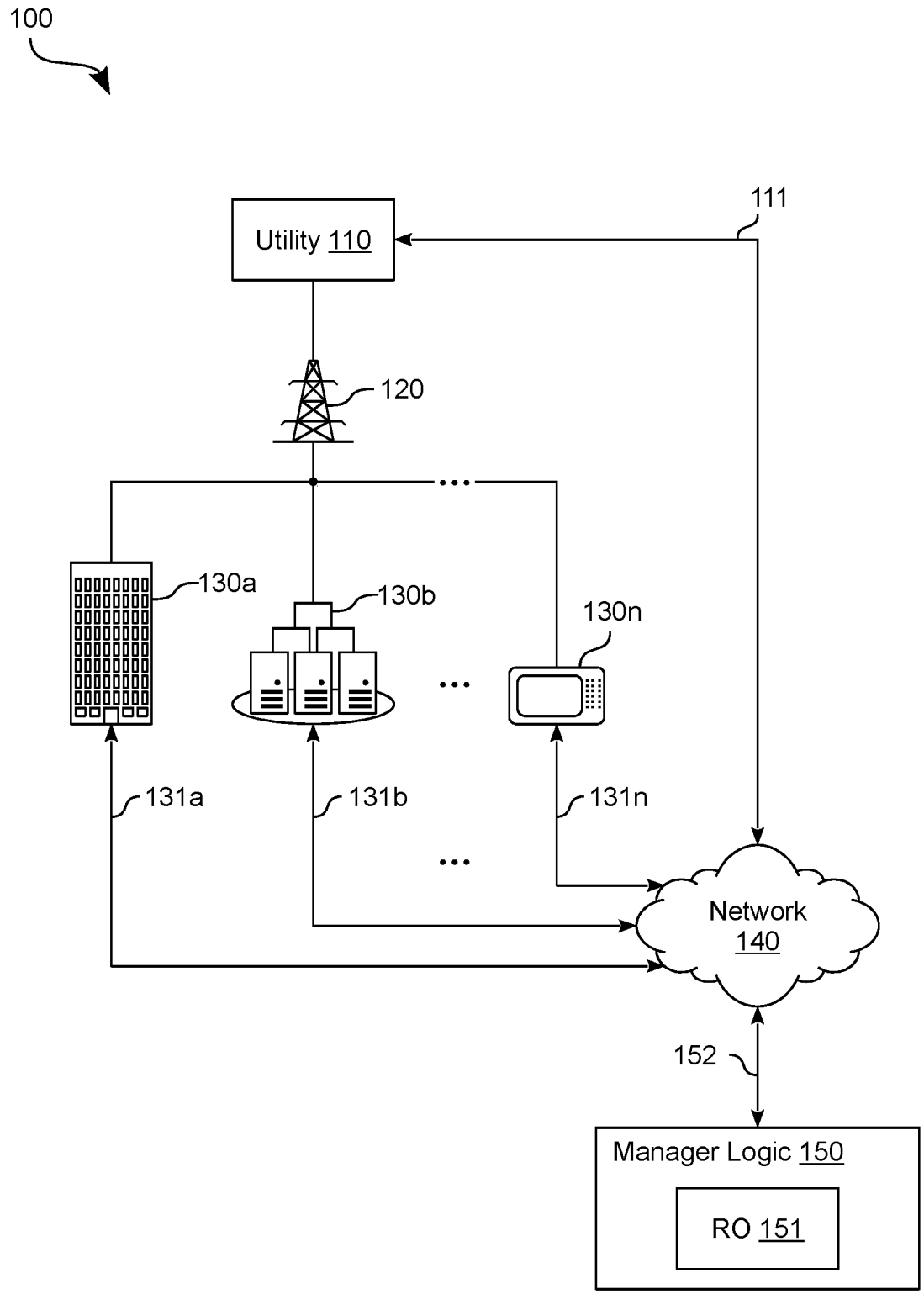
FIG. 1 is a functional block diagram illustrating elements of a system to manage power demand by a utility customer according to an embodiment.

Embodiments discussed herein variously provide techniques and mechanisms for determining one or more constraints to be imposed on resource utilization by customers of an electric utility. In some embodiments, flexibility metrics are determined each for a different respective customer, the flexibility metrics each indicating a respective difference between a metric of resource utilization, and a respective constraint which is imposed on that resource utilization. The customers are ranked, relative to one another, based on the flexibility metrics, where the ranking is used as a basis for identifying one or more utilization constraints which are to be introduced, changed, or otherwise determined to accommodate a change in power delivery by the electric utility.

Certain features of various embodiments are described herein with reference to a scenario wherein an electric utility is to delivery power to some plurality of customers (C1)—e.g., where C1 is at least some subset of all customers of the utility. For each customer of C1, such power delivery enables some resource utilization (symbol u) by that customer—e.g., wherein the resource utilization u comprises a storage of energy (e) with a battery, a consumption of power at a particular rate, and/or the like.

At a given time, power delivery by the utility is according to a power service plan (PP) which specifies, results in, or is otherwise associated with, the power delivery being limited in one or more respects. The term "resource supply metric" (symbol $r_s$) refers herein to a value quantifying a limit—of any of a variety of one or more limits—which, based on a given power service plan, is imposed on the delivery of power to some plurality of customers. In a typical example, a resource supply metric is a threshold maximum power delivery rate that a given power service plan can support, a threshold minimum power delivery rate that the power service plan requires, a target ("ideal") power delivery rate the power service plan, or the like. However, any of various additional or alternative resource supply metrics are used in some embodiments—e.g., including metrics adapted from conventional techniques for quantifying the service capabilities and/or limitations of an electric utility.

The term "utilization constraint" (symbol uc) refers herein to a parameter which, for a given customer of an electric utility, specifies or otherwise indicates a constraint which is to be imposed on a respective resource utilization by that customer. To accommodate a currently-implemented power service plan PP—e.g., to accommodate a resource supply metric $r_s$ corresponding to that plan PP—some embodiments variously calculate, communicate or otherwise provide utilization constraints each for a corresponding one of the plurality of customers C1. Examples of a utilization constraint include, but are not limited to, a threshold maximum power consumption rate by the customer, a threshold minimum power consumption rate by the customer, and a target power consumption rate by the customer. Other examples of a utilization constraint include a threshold maximum amount of energy to be stored by a customer, a threshold minimum amount of energy to be stored by the customer, and a target amount of energy to be stored by the customer. However, any of various additional or alternative utilization constraint parameters are used in some embodiments—e.g., including parameters adapted from conventional techniques for evaluating the demand (load) by a power sink.

To account for changes over time in state of a power delivery system—e.g., including changes to the availability of power generation resources, to the distribution of loads in an electrical grid, or the like—a given utility will transition at some point from delivering power according to one power service plan to an alternative power service plan (e.g., indicated herein as plan PP1 and plan PP2, respectively). The plurality of customers C1 are susceptible to being impacted by such a transition—e.g., due at least in part to the plan PP1 being associated with (e.g., characterized by) some resource supply metric $r_s$ having a first value, whereas the plan PP2 is associated with that same resource supply metric $r_s$ having some different value.

To accommodate a transition between power service plans, some embodiments variously facilitate a transition between a first set UC1 of utilization constraint parameters for the plurality of customers C1 and a second set UC2 of utilization constraint parameters for the plurality of customers C1 (e.g., where the first set and the second set are to accommodate plan PP1 and plan PP2, respectively). In an example scenario according to some embodiments, power delivery according to a plan PP1 is characterized by, or is otherwise associated with, a resource supply metric $r_s$ having a first value v1—e.g., wherein power delivery according to a replacement plan PP2 is associated with $r_s$ having a second value v2 instead. As a result, a transition by the utility between plans PP1, PP2 corresponds to a change $\Delta r_s$ in power service capability—e.g., where $\Delta r_s$ is equal to or otherwise based on the value difference (v2−v1). Some embodiments variously provide for the identification of the second set UC2 of utilization constraint parameters to accommodate such a change $\Delta r_s$—e.g., wherein $\Delta r_s$ is not exceeded by an overall change in resource demand (if any) which is due to a transition of the plurality of customers C1 to the second set UC2.

In some embodiments, determining the second set UC2 of utilization constraints comprises—or is otherwise based on—a selection of one or more customers C2 from among the plurality of customers C1, where the selected one or more customers C2 are each to have a corresponding utilization constraint introduced or changed to accommodate plan PP2. This selection of the one or more customers C2 is based, for example, on a ranked order (RO) of the plurality of customers C1 relative to one another. As described herein, such a ranked order RO is determined, in some embodiments, based on flexibility metrics which each correspond to a different respective customer of the plurality of customers C1. As used herein, "flexibility metric" (symbol f) refers to a value which indicates a resource utilization by a customer to which the flexibility metric corresponds, where the flexibility metric is based on a metric of the resource utilization and is further based on a utilization constraint which is imposed on that resource utilization.

A given flexibility metric indicates, for example, a difference between a resource utilization and a constraint which is imposed on said resource utilization. In some embodiments, a flexibility metric specifies or is otherwise based on a ratio of a first number and a second number, wherein the first number is based on a metric of a resource utilization, and wherein the second number is based on a utilization constraint corresponding to that same resource utilization. By way of illustration and not limitation, some flexibility metrics specify or are otherwise based on a utilization metric which is normalized based on a corresponding utilization constraint uc.

As a result, some embodiments exploit a ranking of customers, based on respective flexibility metrics, as a basis for detecting that one customer, as compared to another customer, would be impacted less by a change to a utilization constraint (where the change is to help accommodate plan PP2). In various embodiments, the selection of the one or more customers C2 includes identifying, based on the ranked order RO, a most flexible customer from among those of the plurality of customers C1 which have yet to be selected to belong to the one or more customers C2. This identified most flexible customer is then selecting to be one of the one or more customers C2. After such selecting, a determination is made as to whether a predicted change in resource demand—the predicted change attributable to the currently selected one or more customers C2—is sufficient to accommodate the (actual or expected) change $\Delta r_s$ which is associated with the transition between plans PP1, PP2.

It is noted by way of explanation that the description herein uses some symbols which variously include a subscript notation of the form "x:#", where "x" is an index used to indicate a particular customer ($c_x$), and "#" is an index for a particular power service plan (PP #). For example, the symbol $u_{1:1}$ refers herein to a metric of resource utilization (or "utilization metric," for brevity) by a customer $c_1$ during a delivery of power according to a plan PP1. By contrast, $u_{2:1}$ is a metric of resource utilization by a different customer $c_2$ during the delivery of power according to plan PP1, whereas $u_{1:2}$ is a metric of resource utilization by customer $c_1$ during a delivery of power according to another plan PP2. In another example, the symbol $uc_{1:1}$ refers to a utilization constraint which is imposed on the resource utilization $u_{1:1}$ by customer $c_1$ during power delivery according to plan PP1. Furthermore, the symbol $f_{1:1}$ indicates a flexibility metric which is based (for example) on resource utilization $u_{1:1}$ and a corresponding constraint—such as $uc_{1:1}$—which is imposed thereon.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

It is pointed out that those elements of the figures having the same reference numbers (or names) as the elements of any other figure can operate or function in any manner similar to that described, but are not limited to such.

FIG. 1 shows features of a system 100, according to an embodiment, to accommodate a transition, by an electric utility, between different power service plans. System 100 is one example of an embodiment wherein hardware and/or executing software is operable to automatically configure (e.g., reconfigure) one or more customers of an electric utility to help accommodate a change in a power delivery service. In an embodiment, the one or more customers are selected based on a ranking of a plurality of customers relative to each other, wherein the ranking itself is based on flexibility metrics which each correspond to a different respective electrical utility customer.

As shown in FIG. 1, system 100 includes a utility 110, a power delivery network 120, and a plurality of customers (such as the illustrative customers 130a, 130b, ..., 130n shown) which are variously coupled to receive power from utility 110 via power delivery network 120. Utility 110 includes any of a variety of public, private or semi-private entities which operate to generate, allocate and/or otherwise provide power for distribution via power delivery network 120. For each of customers 130a, 130b, ..., 130n, the customer comprises a respective one or more devices to function each as a power sink (which constrains its own power utilization) and/or as a controller to constrain another power sink device.

In the context of power delivery, "customer" refers herein to one or more devices which operate—on behalf of a given entity (or a combination of entities) which includes a client of a power delivery service—to facilitate a control of resource utilization by one or more power sinks. Such a device operates (for example) to constrain its own resource utilization, to constrain resource utilization by one or more other devices which operate each on behalf of the same given entity, and/or to constrain resource utilization by one or more devices which operate on behalf of some other entity (for which the given entity is an intermediary, for example).

By way of illustration and not limitation, customer 130n comprises only one device (e.g., a television, a microwave, a refrigerator or other such appliance) which has integrated therein circuitry to constrain its own utilization of power from utility 110. By contrast, customer 130b includes multiple devices—e.g., including one or more servers, refrigerators, water heaters, air conditioners or/other the like—which (for example) are operated on behalf of a common owner, renter or other entity. In one such embodiment, at least one device of customer 130b facilitates a constraining of resource utilization by another device of customer 130b. In still another example, customer 130a includes multiple devices in one building (or a combination of buildings)—e.g., where the multiple devices are operated on behalf of various owners, renters or other entities. In one such embodiment, at least one device of customer 130a facilitates a constraining of resource utilization by another device of customer 130a. System 100 includes more, fewer and/or differently configured customers, in other embodiments. Some embodiments are not limited to a particular number and/or arrangement of customers which are to variously support a constraining of resource utilization as described herein.

System 100 further comprises hardware and/or executing software—represented by the illustrative manager logic (ML) 150 shown—which is operable to determine, communicate, evaluate and/or otherwise process information for use in managing resource utilization by customers 130a, 130b, ..., 130n. Examples of such management functionality include, for example, operation of ML 150 to receive, calculate or otherwise determine a set of flexibility metrics which each correspond to a respective one of customers 130a, 130b, ..., 130n. Alternatively or in addition, such functionality includes ML 150 operating to determine a ranked order RO 151 of customers 130a, 130b, ..., 130n based on the set of flexibility metrics, and to determine—based on such a ranked order—one or more utilization constraints to accommodate a power service plan by utility 110.

In the example embodiment shown, ML 150 is distinct from utility 110 and some or all of customers 130a, 130b, ..., 130n—e.g., wherein ML 150, utility 110 and customers 130a, 130b, ..., 130n are variously coupled to one another via one or more communication networks such as the illustrative network 140 shown. Network 140 includes, for example, an Internet, a wide area network (WAN), a local area network (LAN), a virtual private network (VPN), a cloud network and/or any of various other networks which are suitable for the communication of metric information and constraint information as described herein. In other embodiments, various functionalities of ML 150 are instead distributed across multiple different devices of system 100. Alternatively or in addition, some or all functionality of ML 150 is instead implemented, for example, at one or more of customers 130a, 130b, ..., 130n.

In an example embodiment, customers 130a, 130b, ..., 130n variously participate in respective communications 131a, 131b, ..., 131n with ML 150 via network 140. For example, communication 131a specifies or otherwise indicates to ML 150 a flexibility metric $f_{1:1}$ for a resource utilization by customer 130a during implementation of a first power service plan PP1 with utility 110. Similarly, communication 131b specifies or otherwise indicates to ML 150 another flexibility metric $f_{2:1}$ for a resource utilization by customer 130b during implementation of plan PP1—e.g., where communication 131n specifies or otherwise indicates to ML 150 a flexibility metric $f_{n:1}$ for a resource utilization by customer 130n during implementation of plan PP1.

Based on the flexibility metrics $f_{1:1}$, $f_{2:1}$, ..., $f_{n:1}$ variously indicated by communications 131a, 131b, ..., 131n, ML 150 determines a ranked order RO 151 of customers 130a, 130b, ..., 130n relative to one another. In an example embodiment, ranked order RO 151 represents a listing of customers 130a, 130b, ..., 130n from a customer which is relatively most able to tolerate a more stringently constrained resource utilization, to a customer which is relatively least able to tolerate a more stringently constrained resource utilization. In some embodiments, ML 150 regularly monitors customers 130a, 130b, ..., 130n to maintain an up-to-date ranked order 151—e.g., wherein such monitoring is according to a predetermined schedule or otherwise responsive to some predefined class of trigger events.

At some point during operation of system 100, utility 110 identifies a need to transition from plan PP1 to another power service plan PP2 for providing power to customers 130a, 130b, ..., 130n. In response to such identifying, utility 110 provides to ML 150 a communication 111 which indicates the transition (actual or intended) from plan PP1 to plan PP2. In some embodiments, for example, communication 111 specifies or otherwise indicates that power delivery according to plan PP2 is to be characterized by a value vs2 of a resource supply metric $r_s$—e.g., in contrast with power delivery according to plan PP1 being characterized by a value vs1 of resource supply metric $r_s$.

To accommodate the transition from plan PP1 to plan PP2—e.g., including accommodating a change $\Delta r_s$ to the value of resource supply metric $r_s$—ML 150 selects one or more of customers 130a, 130b, ..., 130n for which respective utilization constraints are to be changed. Such selection of the one or more customers is performed according to RO 151—e.g., where communications 152 from ML 140 are generated, based on such selection, to indicate one or more new utilization constraints each to a respective one of customers 130a, 130b, ..., 130n. Responsive to communications 152, the selected one or more of customers 130a, 130b, ..., 130n each configure a respective change to a corresponding utilization metric. Based on such utilization metric (re)configuration, customers 130a, 130b, ..., 130n exhibit resource demand characteristics which accommodate the change $\Delta r_s$ to the resource supply metric $r_s$ which is due to the transition to plan PP2.

Figure 2A:
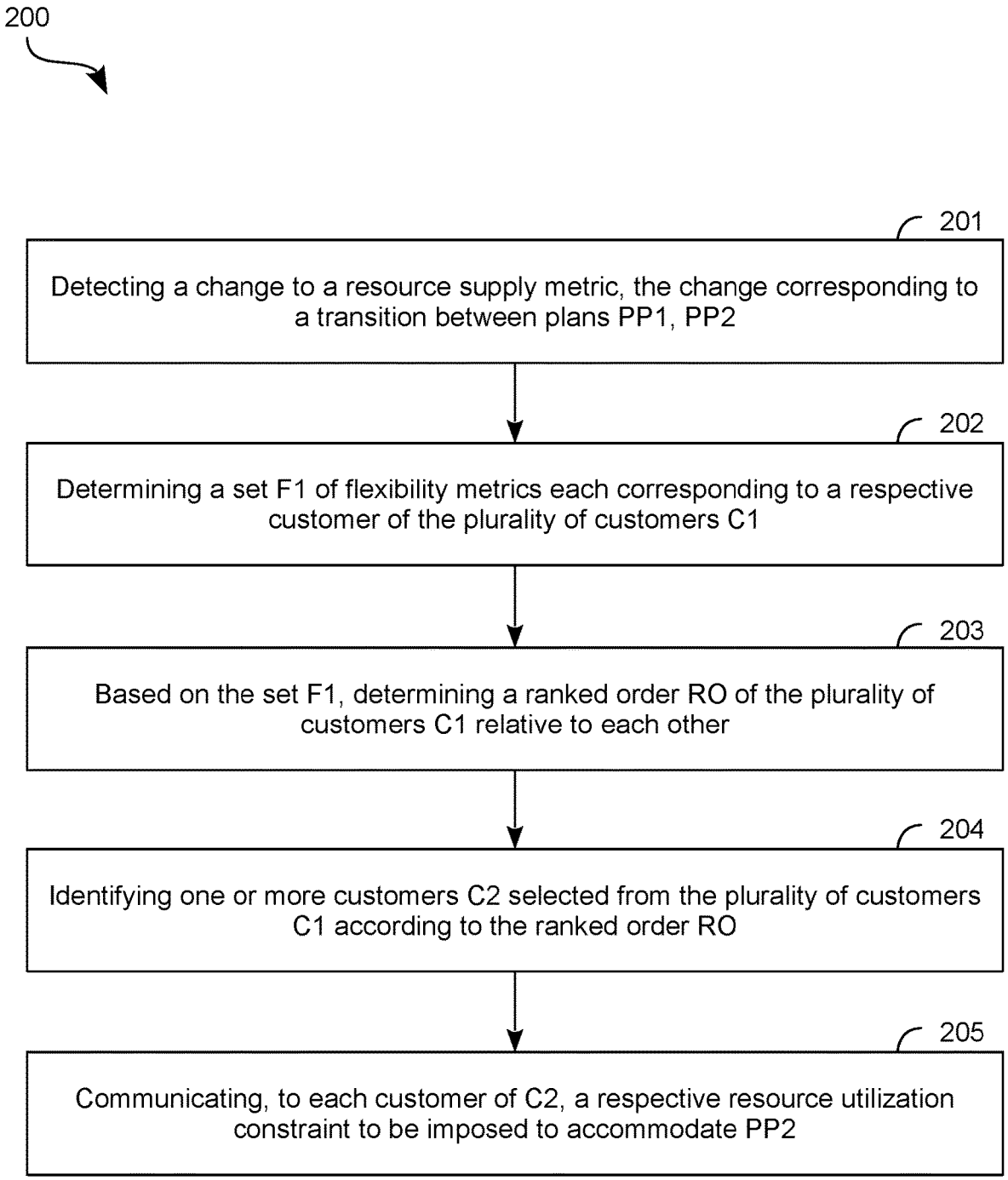
FIG. 2A is a flow diagram illustrating elements of a method, according to an embodiment, for determining a constraint on power demand by a utility customer.

FIG. 2A shows features of a method 200 to determine operational constraints of one or more customers of a utility, where such constraints are to accommodate a transition by the utility to a different power service plan. Method 210 is performed with hardware and/or executing software which provides functionality (such as that of manager logic 150, for example) to select one or more customers, based on various flexibility metrics, each for an updating of a respective resource utilization constraint.

As shown in FIG. 2A, method 200 includes (at 201) detecting a change—e.g., an already-implemented change or an planned future change—to a resource supply metric $r_s$, where the change corresponds to a transition between different power service plans PP1, PP2 to deliver power from a utility to a plurality of customers C1. For example, the resource supply metric $r_s$ comprises, in some embodiments, one of a maximum rate of power delivery, a minimum rate of power delivery, or a target rate of power delivery according to a given power service plan—wherein plans PP1, PP2 are characterized each by a different respective value of the resource supply metric $r_s$. In one such embodiment, a device which performs method 200—e.g., a device of ML 150 (or other suitable logic)—receives from the utility, or otherwise has access to, information describing plans PP1, PP2 at least in part. The detecting at 201 comprises, for example, ML 150 receiving a communication which specifies or otherwise indicates a difference between values of resource supply metric $r_s$ which each correspond to a respective one of plans PP1, PP2.

In the embodiment shown, method 200 further comprises (at 202) determining a set F1 of flexibility metrics which each correspond to a respective customer of the plurality of customers C1. For each flexibility metric of the set F1, the flexibility metric indicates a difference between a resource utilization by the corresponding customer, and a utilization constraint which is imposed on that resource utilization to accommodate the plan PP1. In some embodiments, a given flexibility metric $f_{x:1}$ of the set F1 corresponds to a customer $c_x$ of the plurality of customers C1—e.g., wherein the first flexibility metric is calculated by hardware logic and/or executing software logic of that customer $c_x$ prior to communication of the flexibility metric $f_{x:1}$, via a network, from customer $c_x$ to a device which performs some or all of method 200.

In an example scenario, a given flexibility metric $f_{x:1}$ of the set F1 is based on a function of both a resource utilization $u_{x:1}$ by customer $c_x$ (the utilization during power delivery according to plan PP1), and at least one utilization constrain which is imposed on the resource utilization $u_{x:1}$. The function includes, for example, a ratio of a first number and a second number, wherein the first number is based on the utilization metric $u_{x:1}$, and the second number is based on a constraint which is imposed on the resource utilization. One example of such a function is the following:

$$f_{x:1} = \left(\frac{u_{x:1}}{uc_{x:1}}\right), \qquad (1)$$

where $uc_{x:1}$ is a target value for the utilization metric $u_{x:1}$. Another example of such a function is the following:

$$f_{x:1} = \left(\frac{(u_{x:1} - uc_{x:1l})}{(uc_{x:1h} - uc_{x:1l})}\right), \qquad (2)$$

where $uc_{x:1l}$ and $uc_{x:1h}$ are, respectively, a lower threshold limit an upper threshold limit for the utilization metric $u_{x:1}$. Any of various other such functions are used, in different embodiments, to evaluate a flexibility metric based on a resource utilization and a corresponding utilization constraint parameter. In some embodiments, different functions are used each to determine a flexibility metrics for a respective customer.

Method 200 further comprises (at 203) determining, based on the set F1, a ranked order RO of the plurality of customers C1 relative to each other. In an example scenario for one embodiment, the ranked order RO determined at 203 includes an ordering $c_1, c_2, \ldots, c_n$ of n customers which correspond, respectively, to flexibility metrics $f_{1:1}$, $f_{2:1}, \ldots, f_{n:1}$. This ordering is based on the set F1 indicating that, of the plurality of customers C1, customer $c_1$ is the most tolerant of additional resource constraint, customer $c_2$ is the second most tolerant, and customer $c_n$ is the least tolerant of additional resource constraint. In one such embodiment—e.g., one which determines a flexibility metric according to equation (1) or equation (2)—the ordering $c_1, c_2, \ldots, c_n$ is based on $f_{1:1} < f_{2:1} < \ldots < f_{n:1}$. However, other embodiments variously use inverse (or otherwise different) flexibility metric functions, wherein a relatively high flexibility metric value corresponds to a greater tolerance for more stringently constrained resource utilization.

Method 200 further comprises (at 204) identifying one or more customers C2 which are selected from the plurality of customers C1 according to the ranked order RO. In an embodiment, the identifying at 204 includes determining that a predicted contribution to a change to a resource demand metric ($r_d$)—the predicted contribution to be provided by the one or more customers C2—is sufficient to offset or otherwise accommodate the change to the resource supply metric $r_s$. For example, in one embodiment, identifying the one or more customers C2 at 204 comprises identifying a most flexible customer from among those of the plurality of customers C1 which have yet to be selected as one of the one or more customers C2. This identified next most flexible customer is then selected to be one of the one or more customers C2, and a predicted resource demand value is calculated based on a planned change to a utilization constraint which corresponds that selected customer. Based on such a predicted resource demand value—and further based on the change to the resource supply metric $r_s$ (detected at 201)—a determination is made as to whether an additional customer is to be selected for inclusion in the one or more customers C2.

Method 200 further comprises (at 205), for each customer of the one or more customers C2, communicating to that customer a respective constraint $uc_{x:2}$ to be imposed on a respective resource utilization by the customer to accommodate the plan PP2. A given utilization constraint $uc_{x:2}$ is calculated or otherwise determined, for example, during operations to identify the selected one or more customers C2 at 204.

In some embodiments, a utilization constraint $uc_{x:2}$—to be imposed by a customer $c_x$ during a plan PP2—is determined according to a predefined function which, for example, is based on a resource utilization $u_{x:1}$ by that customer $c_x$ during a preceding plan PP1, and further based on an earlier utilization constraint $uc_{x:1}$ which is imposed on the utilization $u_{x:1}$. By way of illustration, in an embodiment where the constraint $uc_{x:1}$ is a target value for the utilization $u_{x:1}$—e.g., see equation (1)—the next constraint $uc_{x:1}$ is determined, for example, according to the following:

$$uc_{x:2} = u_{x:1}, \qquad (3)$$

or, in another embodiment, according to the following:

$$uc_{x:2} = \frac{1}{2}(uc_{x:1} + u_{x:1}). \qquad (4)$$

In another embodiment, where a lower utilization constraint $uc_{x:1l}$ and an upper utilization constraint $uc_{x:1h}$ are imposed on the utilization $u_{x:1}$—e.g., see equation (2)—a next lower utilization constraint $uc_{x:2l}$ is determined, for example, according to the following:

$$uc_{x:2l} = (uc_{x:1l})\left(\frac{2(u_{x:1})}{(uc_{x:1h} - uc_{x:1l})}\right), \quad (5)$$

where a next upper utilization constraint $uc_{x:2h}$ is determined, for example, according to the following:

$$uc_{x:2h} = (uc_{x:1h})\left(\frac{2(u_{x:1})}{(uc_{x:1h} - uc_{x:1l})}\right). \quad (6)$$

Alternatively, the next lower utilization constraint $uc_{x:2l}$ is determined, for example, according to the following:

$$uc_{x:2l} = u_{x:1} - \frac{1}{2}(uc_{x:1h} - uc_{x:1l}), \quad (7)$$

where the next upper utilization constraint $uc_{x:2h}$ is determined, for example, according to the following:

$$uc_{x:2h} = u_{x:1} + \frac{1}{2}(uc_{x:1h} - uc_{x:1l}), \quad (8)$$

Equations (3)-(8) are illustrative of only some techniques for determining an updated utilization constraint. However, any of various alternative equation are used, in different embodiments—e.g., including equations adapted from conventional techniques for adapting a power demand be a utility customer.

In some embodiments, method 200 comprises additional operations (not shown) which are performed during a delivery of power by the utility according to plan PP2. Such additional operations include, for example, determining another set F2 of flexibility metrics which each correspond to a respective customer of the plurality of customers C1. A determination is made, based on such a set F2, that an actual contribution, provided by the one or more customers C2 to the change to the resource demand metric, is insufficient to accommodate the change to the resource supply metric $r_s$. Responsive to this determination, another of the plurality of customers C1 is added to the one or more customers C2 (according to the ranked order RO), and/or a utilization constraint for one of the one or more customers C2 is updated. This adding to the one or more customers C2 and/or updating of one or more utilization constraints is performed, for example, to provide an updated resource demand metric which accommodates the change to the resource supply metric $r_s$.

In some embodiments, identifying the one or more customers C2 at 204 comprises selecting the one or more customers C2 at a device (such as ML 150 of system 100) which is coupled, via a communication network, to at least one customer of the plurality of customers C1—e.g., where the device is one other than any device of the plurality of customers C1. In other embodiments, identifying the one or more customers C2 at 204 comprises selecting the one or more customers C2 at a device of one of the plurality of customers C1. In an example embodiment, determining the set F1 at 202 comprises a device—such as ML 150—receiving, via a communication network, multiple flexibility metrics each from a different respective one of the plurality of customers C1, wherein identifying the one or more customers C2 at 204 comprises selecting the one or more customers C2 at said device. In some embodiments, determining the set F1 of flexibility metrics at 202 comprises participating in network communications, according to a pre-determined schedule, to automatically retrieve indicia of flexibility metrics each from a respective customer of the plurality of customers C1.

In some embodiments, method 200 comprises additional operations (not shown) which are variously performed for each multiple power service plan in a sequence of such plans, by the utility, to deliver power to the plurality of customers C1. For a given one of such power service plans, the additional operations include, for example, determining a respective set of flexibility metrics which each correspond to a respective customer of the plurality of customers C1. Based on such a set of flexibility metrics, a respective ranked order of the plurality of customers C1 is determined, in some embodiments. A respective one or more customers are then selected from the plurality of customers C1 according to the respective ranked order, where the selecting is based on a predicted contribution to be provided by the respective one or more customers to accommodate the plan.

FIG. 2B shows features of a method 210 to reconfigure one or more customers of a utility, where such reconfiguration is to accommodate a transition to a different power service plan of the utility. Method 210 is performed, for example, at some customer device $c_x$ such as a device of one of customers 130a, 130b, . . . , 130n—e.g., in combination with another one or more devices performing method 200.

As shown in FIG. 2B, method 210 includes, at 211, constraining a resource utilization by the customer, where the constraining (based on a parameter $uc_{x:1}$) is to accommodate at least in part a delivery of power according to a power service plan PP1. The constraining at 211 includes, for example, controlling energy storage with a battery, power consumption by a load circuit, and/or any of various other operational characteristics of the device so that a metric of the resource utilization is below a threshold maximum value, above a threshold minimum value, closer to a target value, or the like.

Method 200 further comprises (at 212) communicating an indication of a flexibility metric $f_{x:1}$ which is based on both a metric of the resource utilization and the parameter $uc_{x:1}$. For example, a customer device performing method 210 includes, or otherwise has access to, monitoring circuitry which identifies a value of the resource utilization metric during power delivery according to plan PP1. In some embodiments, the monitoring circuitry (or other suitable logic of the device) calculates a value of the flexibility metric $f_{x:1}$ based on the value of the resource utilization metric. As indicated elsewhere herein, such a flexibility metric $f_{x:1}$ indicates a difference between the resource utilization metric and the corresponding utilization constraint parameter $uc_{x:1}$. In an embodiment, the communicating at 212 contributes in part to the determining of the set F1 at 203 of method 200.

Based on the communicating at 212, a ranked order RO of the plurality of customers C1 is automatically determined (e.g., at ML 150 or other suitable logic to perform method 200), and one or more customers C2 are selected from among the plurality of customers C1 according to the ranked order RO. Based on the selection of the one or more customers C2, a predicted contribution to a resource demand change (the contribution to be provided by the one or more customers C2) is determined to be sufficient to accommodate a transition from the plan PP1 to another plan PP2. In an embodiment, method 200 further comprises (at 213) the customer device receiving an indication of a parameter $uc_{x:2}$ which—for example—is provided by the communicating at 205 of method 200. Method 200 further comprises (at 214) constraining a resource utilization, based on the parameter $uc_{x:2}$, to accommodate the power service plan PP2.

Figure 3:
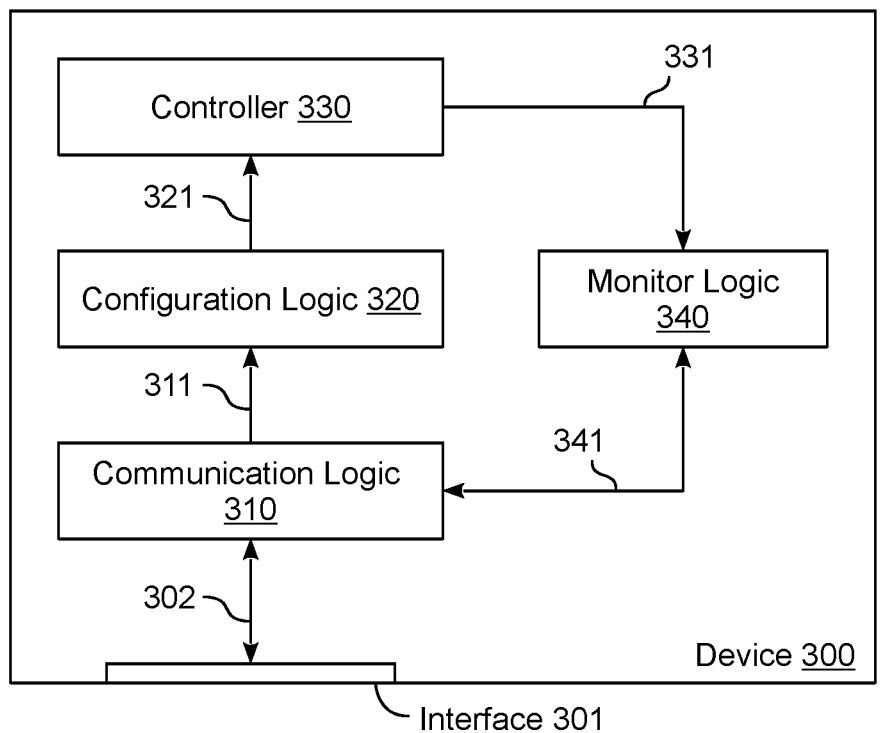
FIG. 3 is a functional block diagram illustrating elements of a device, according to an embodiment, to constrain utilization of a power service provided by a utility.

FIG. 3 shows features of a device 300 to communicate flexibility metric information according to an embodiment, where such information provides a basis for a configuration to accommodate a power service plan. Device 300 is a device of one of customers 130a, 130b, . . . , 130n (for example) and/or facilitates a performance of method 210. In some embodiments, device 300 comprises any of a variety of devices—e.g., including one of a tablet (or other handheld device), a laptop computer, desktop computer, server, smart appliance, smart thermostat or the like—which is operable to monitor and constrain its own power use and/or that of another device coupled thereto. Alternatively or in addition, device 300 comprises, for example, integrated circuitry (such as an application-specific integrated circuit) which is disposed on a chip and/or in a package of a larger device.

As shown in FIG. 3, device 300 comprises a hardware interface 301 by which device 300 is to couple to one or more other devices via a communication network (such as network 140, for example). Communication logic 310 of device 300 is coupled to participate in communications 302 via interface 310—e.g., the communications 302 with ML 150 or other suitable logic—e.g., to facilitate the determining of a resource utilization constraint for device 300 (or for some other device coupled thereto). For example, in some embodiments, communication logic 310 supports an application protocol for communication via a switched network. Alternatively or in addition, communication logic 310 supports a dedicated protocol for the communication of power demand/supply control information such as that described herein.

In an example scenario according to one embodiment, communication logic 310 detects, based on communications 302, a metric of a resource demand constraint that is to be supported by device 300—e.g., to accommodate a particular power service plan of an electric utility which provides power to device 300. An indication 311 of the detected resource demand constraint is provided to hardware and/or software logic (such as the illustrative configuration logic 320 shown) which, in response, identifies one or more corresponding resource utilization constraints—e.g., including one or more threshold values and/or one or more target values each for a corresponding characteristic of resource utilization by device 300.

Based on the one or more resource utilization constraints, configuration logic 320 provides signaling 321 to a controller 330 of device 300—e.g., where controller 330, according to signaling 321, regulates energy storage, power consumption and/or any of various other operational characteristics of one or more sink circuits (not shown) that are included in or coupled to device 300. During the operation of device 300—e.g., during power delivery to device 300 according to a given power service plan of the electric utility—controller 330 provides to monitor logic 340 of device 300 a signal 331 which specifies or otherwise indicates a metric of actual resource utilization by the one or more sink circuits.

Based on such a metric of resource utilization, and a corresponding one or more utilization constraints which are imposed on said resource utilization, monitor logic (in some embodiments) calculates a value of a flexibility metric which is to correspond to device 300. Such a flexibility metric is provided—e.g., via signaling 341—for communication from device 300. In some embodiments, communication of the flexibility metric from device 300 results in some external device—which provides functionality such as that of ML 150—determining a ranking of device 300 in a ranked order of multiple power utility customers. Such a ranking facilitates the selecting of one or more customers each to have a respective utilization constraint updated, introduced or otherwise determined. For example, device 300 may be selected to receive via communications 302 an update to a utilization constraint parameter.

Figure 4:
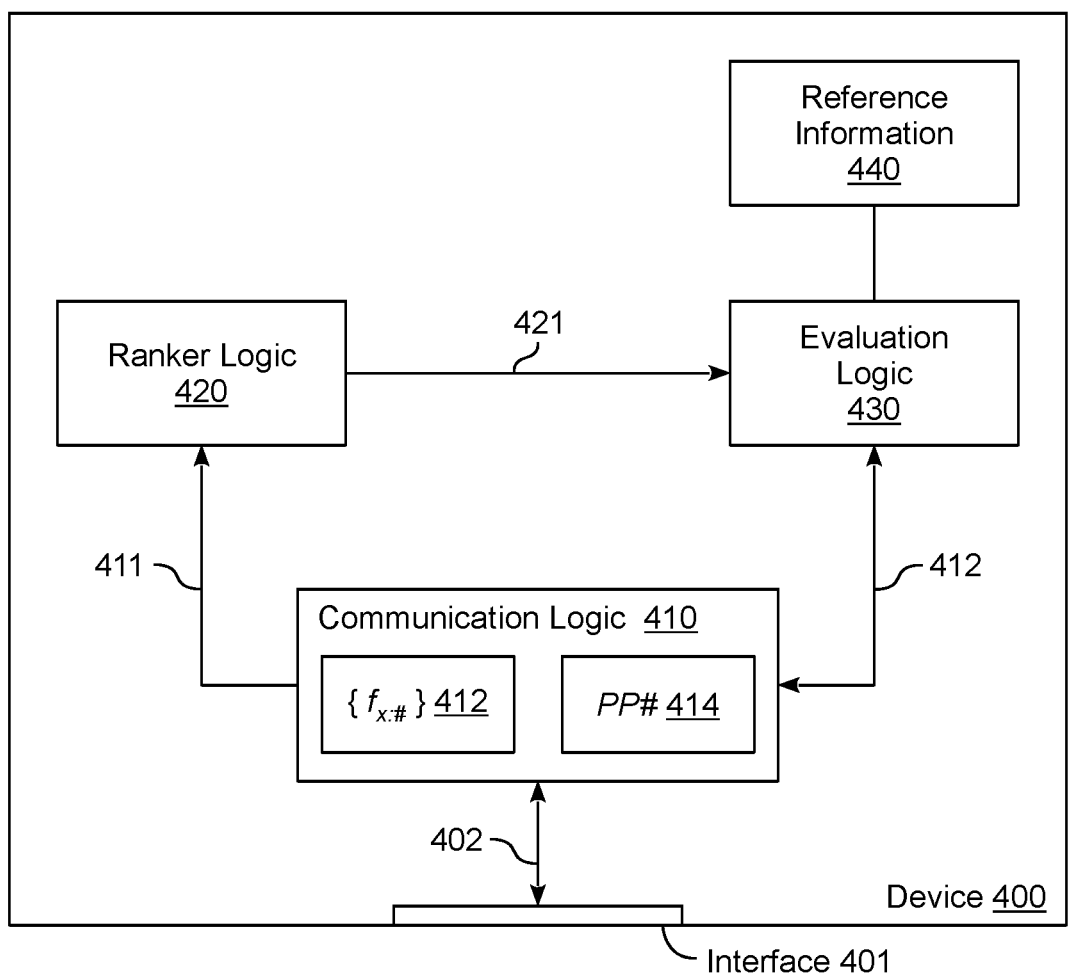
FIG. 4 is a functional block diagram illustrating elements of a device, according to an embodiment, to determine a constraint on power demand by a utility customer.

FIG. 4 shows features of a device 400 to identify one or more customers of an electric utility, where the one or more customers are selected to help accommodate a transition by the electric utility from one power service plan to another power service plan. In an embodiment, the selection is based on a ranked order of a plurality of customers—e.g., wherein the ranked order is based on flexibility metrics which each corresponds to a respective one of the plurality of customers. Device 400 includes features of manager logic 150 (for example) and/or facilitates a performance of method 200.

As shown in FIG. 4, device 400 includes a hardware interface 401 by which device 400 is to couple to various utility customers via a communication network (such as network 140, for example). Communication logic 410 of device 400 is coupled to facilitate various communications 402 with such utility customers via interface 401. In an embodiment, communication logic 410 detects, based on communications 402, a power service plan PP #414 to be implemented by the electric utility—e.g., wherein communications 402 specify or otherwise indicate one or more resource supply metrics associated with plan PP #414. Alternatively or in addition, communication logic 410 determines, based on communications 402, a set of flexibility metrics $\{f_{x:\#}\}$ 412 each corresponding to a respective customer $c_x$ and the detected power service plan PP #414.

Communication logic 410 is coupled to provide to ranker logic 420 of device 400 a signal 411 which identifies the set of flexibility metrics $\{f_{x:\#}\}$ 412. Ranker logic 420 comprises circuitry and/or executing software to determine a ranked order of the plurality of customers, where the ranked order is based on the the set of flexibility metrics $\{f_{x:\#}\}$ 412 indicated by signal 411. An indication 421 of the ranked order is provided, for example, to evaluation logic 430 of device 400. Evaluation logic 430 further receives from communication logic 420 an indication of one or more resource supply metrics associated with the power service plan PP #414. Based on the ranked order indicated by ranker logic 420, and further based on the power service plan PP #414, evaluation logic 430 selects one or more customers to contribute to an accommodation of the power service plan PP #414. An output 430 from evaluation logic specifies or otherwise indicates to communication logic 410 updated resource constraints each for a respective one of the selected customers. In an embodiment, communication logic 410 provides these updated resource constraints, via communications 402, for application by their corresponding utility customers.

In an example scenario according to one embodiment, communication logic 410 detects—e.g., based on communications from the electric utility—a plan PP1 to provide power from the utility to a plurality of customers C1. Communication logic 410 determines, for example, a first value vu1 of a resource supply metric $r_s$, where the first value vu1 is characteristic of power delivery according to the corresponding plan PP1.

Communication logic 410 further supports functionality to determine a set F1 of flexibility metrics $\{f_{x:1}\}$ which each correspond to a respective customer of the plurality of customers C1. For example, some or all of the metrics are each communicated to device 400 after being calculated locally, at a corresponding one of the plurality of customers C1, based on the delivery of power according to plan PP1. Based on the set F1 of flexibility metrics $\{f_{x:1}\}$, ranker logic 420 determines, and makes available to evaluation logic 430, a ranked order RO of the plurality of customers C1.

After some period of time, during which power is delivered according to plan PP1, communication logic 410 detects an alternative power service plan PP2 which is to replace plan PP1—e.g., wherein communication logic 410 receives from the utility a second value vu2 of the supply metric $r_s$ (the second value vu2 corresponding to plan PP2). Based on the detected plan PP2, evaluation logic 430 identifies a difference between the first value vu1 and the second value vu2 of the supply metric $r_s$. Evaluation further performs operations to arrange for the imposition of one or more resource utilization constraints, each by a respective customer of a selected one or more customers, to provide a change $\Delta r_d$ to a resource demand metric $r_d$, where the change $\Delta r_d$ is sufficient to offset or otherwise accommodate an expected change $\Delta r_s$—e.g., equal to (vu2−vu1)—to the supply metric $r_s$ In one example embodiment, evaluation logic 430 identifies one or more customers C2 which are selected from the plurality of customers C1, the selection according to the ranked order RO. For each customer of the one or more customers C2, evaluation logic 430 performs a calculation, look-up or other suitable operation to determine, based on the flexibility metric corresponding to that customer, a respective updated utilization constraint which is to be imposed by that customer to help accommodate plan PP2. Such operations are based, for example, on reference information 440 (or other configuration state available to evaluation logic 430) which specifies or otherwise indicates currently-imposed utilization constraints, current resource utilization metrics, models of expected customer power use, one or more functions which are used to calculate flexibility metrics, one or more functions which are used to calculate an updated utility constraint value, and/or the like. In various embodiments, some or all of reference information 440 is predefined—e.g., based on one or more conventional techniques for determining criteria to predict future power use by a load device. Some embodiments are not limited to a particular source or sources of reference information 440, or to a particular mechanism by which which reference information 440 is available to device 400.

Based on the updated utilization metrics determined for the one or more customers C2, evaluation logic 430 calculates a predicted overall contribution $\Delta r_d$, by the one or more customers C2, to a change to the resource demand metric $r_d$. For example, evaluation logic 430 determines that enough customers have been selected, for inclusion in the one or more customers C2, for their predicted overall contribution to be sufficient to accommodate the expected change $\Delta r_s$. For each customer of the selected one or more customers C2, communication logic 410 communicates to that customer that the corresponding updated utilization constraint is to be imposed by the customer.

Figure 5:
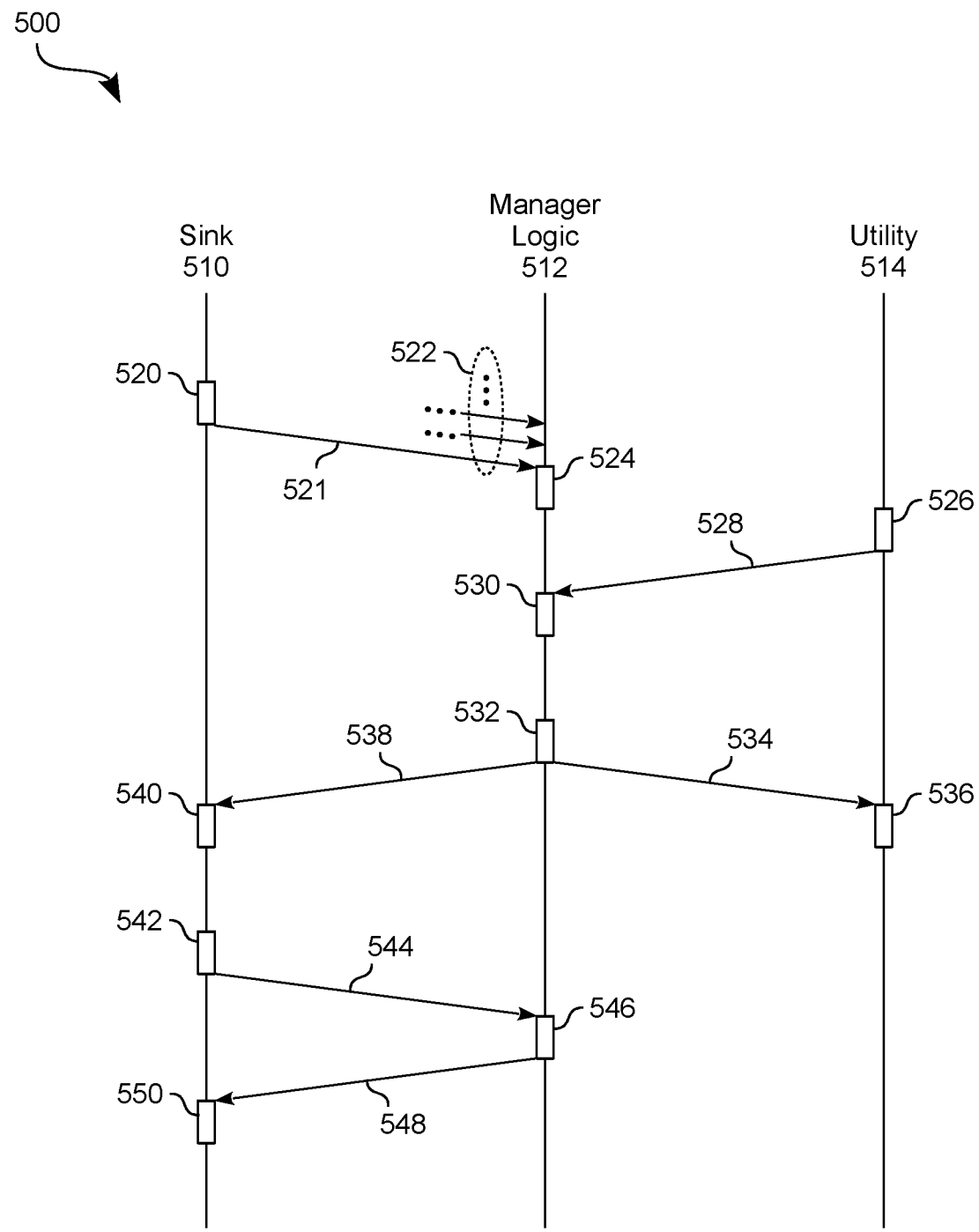
FIG. 5 is a swim lane diagram illustrating operations variously performed with participants in a power delivery system according to an embodiment.

FIG. 5 illustrates operations 500, according to an embodiment, for determining resource utilization constraints which are to be variously imposed with customers of an electric utility. Operations 500 are performed, for example, with system 100—e.g., wherein device 300 and/or device 400 participates in operations 500. In some embodiments, some or all of operations 500 are performed according to method 200.

As shown in FIG. 5, operations 500 are performed with some or all of a utility 514, a sink 510 which receives power from utility 514 (where sink is, belongs to, or otherwise operates on behalf of, a utility customer) and manager logic 512 which, for example, provides functionality of manager logic ML 150 or device 400. In an embodiment, operations 500 comprise a control and monitor process 520—by circuit logic and/or executing software of sink 510—which constrains power utilization by a customer device $c_1$ which includes, is a component of, or is coupled to, sink 510. Control and monitor process 520 is based on a utilization constraint parameter $uc_{1:1}$ which is imposed to accommodate, at least in part, a delivery of power by utility 514 according to a power service plan PPL Control and monitor process 520 further determines a metric $u_{1:1}$ of the resource utilization (constrained based on $uc_{1:1}$) by device $c_1$. Based on the metric $u_{1:1}$ and constraint $uc_{1:1}$, control and monitor process 520 further determines a flexibility metric $f_{1:1}$ for device $c_1$.

Based on the control and monitor process 520, sink 510 sends a signal 521 which identifies to manager logic 512 the flexibility metric $f_{1:1}$. Signal 521 is one of multiple signals 522 which manager logic 512 variously receives each from a respective customer of a plurality of customers C1—e.g., the signals 522 each identifying a respective flexibility metric for a corresponding customer. For example, processing 524 by manager logic 512 identifies, based on signals 522, a set of flexibility metric values $\{f_{x:1}\}$ each corresponding to a respective one of the customers C1. The processing 524 further determines, based on the set $\{f_{x:1}\}$, a ranked order RO of the customers C1 with respect to one another.

At some point in time during operations 500, processing 526 by utility 514 detects that a different power service plan PP2 is to substitute plan PP1. Based on processing 526, utility 514 generates a signal 528 which specifies or otherwise indicates one or more characteristics associated with power delivery according to plan PP2. For example, processing 530 by manager logic 512 detects, based on signal 528, that plan PP2 is to substitute plan PP1—e.g., wherein processing 530 identifies a value of a resource supply metric $r_s$ (the value associated with power delivery according to plan PP2). Further processing 532 by manager logic 512 determines, based on the set of flexibility metric values $\{f_{x:1}\}$, a set of utilization constraints $\{uc_{x:2}\}$ which each correspond to a respective one of customers C1. Based on the identified value of the supply metric $r_s$, and further based on the set $\{uc_{x:2}\}$, processing 532 selects one or more customers C2 from the plurality of customers C1 (where the selection is according to the ranked order RO).

Based on processing 532, manager logic 512 communicates, for each customer of the one or more customers C2, a respective signal indicating that a corresponding one of constraints $\{uc_{x:2}\}$ is to be imposed by that customer. For example, manager logic 512 provides a signal 538 which specifies or otherwise indicates a utilization constraint $uc_{1:2}$ to be imposed with sink 510 to help accommodate plan PP2. Based on signal 538, processing 540 by sink 510 constrains resource utilization by device $c_1$—e.g., where the constraining is based on the indicated $uc_{1:2}$. In some embodiments, another signal 534 (based on processing 532) is sent from manager logic 512 to indicate to utility 514 that the plurality of customers C1 are ready to receive power according to plan PP2. In response, processing 536 by utility 514 begins to implement plan PP2.

Although some embodiments are not limited in this regard, operations 500 further include (for example) additional operations to update one or more resource utilization constraints during power delivery according to plan PP2. The updating of such constraints is performed, for example, in response to a determination that the selected one or more customers C2 have failed to sufficiently accommodate a change $\Delta r_s$ (caused by the transition to plan PP2) to the resource supply metric $r_s$.

For example, operations 500 further comprise processing 542, by sink 510, which determines a metric $u_{1:2}$ of resource utilization by device $c_1$ during power delivery according to plan PP2. Based on processing 542, sink 510 generates a signal 544 which indicates to manager logic 512 a metric $r_{d1:2}$ of power demand (e.g., where the power demand metric $r_{d1:2}$ is equal to or otherwise based on the determined utilization metric $u_{1:2}$). In some embodiments, signal 544 specifies utilization metric $u_{1:2}$, power demand metric $r_{d1:2}$ and/or a flexibility metric $f_{1:2}$ (which, for example, is calculated based on utilization metric $u_{1:2}$ and utilization constraint $uc_{1:2}$). Based on the metric information communicated with signal 544, processing 546 by manager logic 512 performs an update (e.g., an addition or at least one customer) to the one or more customers C2 and/or an update to one or more of utilization constraints for the previously-selected one or more customers C2. In the example embodiment shown, manager logic 512 generates a signal 548 (based on the processing 546) which communicates to sink 510 an indication of an updated utilization constraint $uc_{1:2}'$. Based on signal 548, sink 510 performs processing 550 to constrain resource utilization, by device $c_1$, according to the updated $uc_{1:2}'$.

Figure 6:
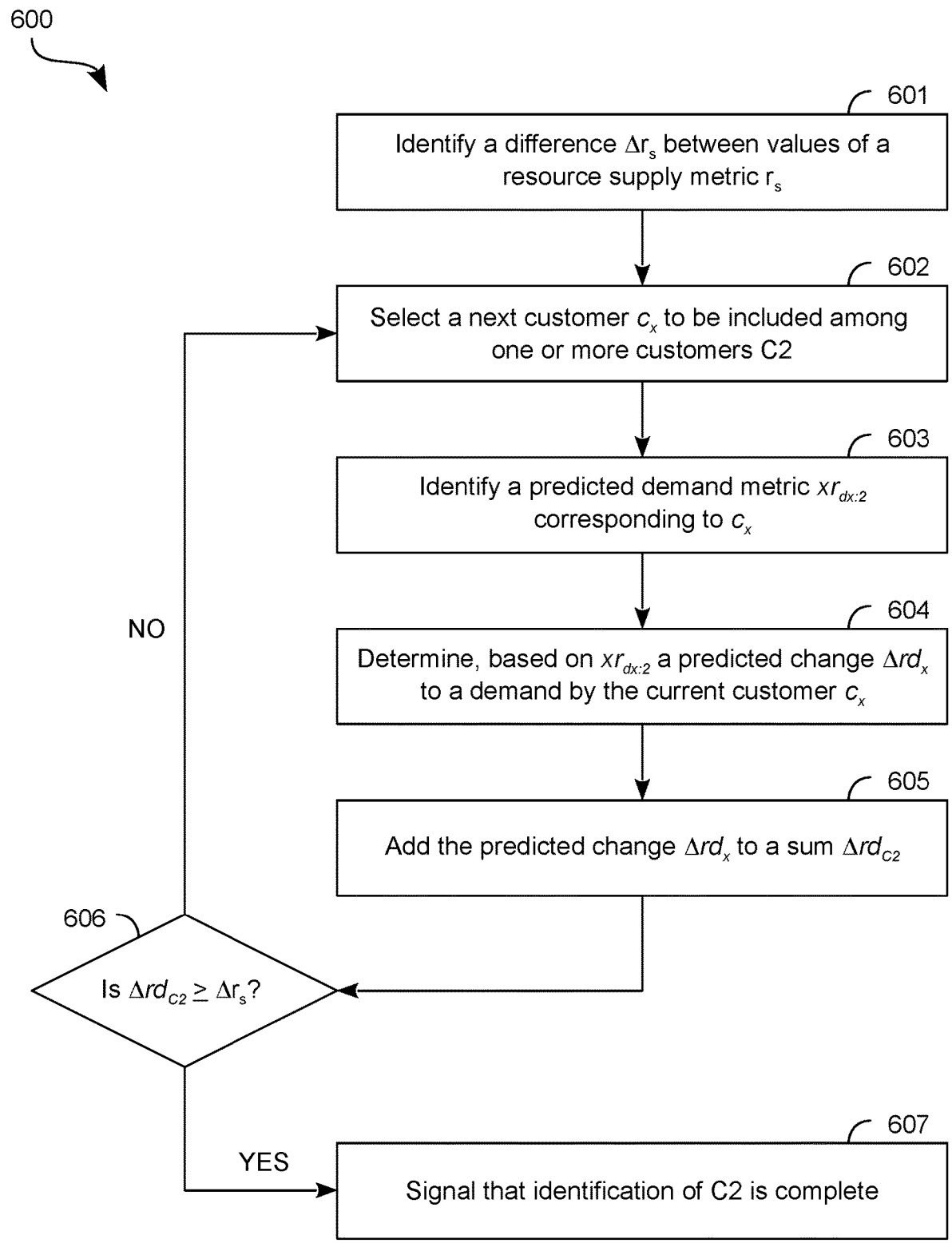
FIG. 6 is a flow diagram illustrating operations, according to an embodiment, for determining a constraint on power demand by a utility customer.

FIG. 6 illustrates operations 600 to identify, according to an embodiment, one or more customers which are selected from a plurality of electric utility customers to help accommodate a power service plan. Operations 600 are performed, for example, with manager logic 150, device 400 or any of various other suitable circuitry and/or executing software. In various embodiments, operations 600 perform the processing 532 by manager logic 512, or (for example) the identifying of one or more customers C2 at 204 of method 200.

As shown in FIG. 6, operations 600 include (at 601) identifying a difference $\Delta r_s$ between two values of the same resource supply metric $r_s$—e.g., where the values each correspond to a different respective one of two power service plans PP1, PP2. Furthermore, at 602, operations 600 select a next customer $c_x$ to be included among one or more customers C2 of the electric utility (where the one or more customers C2 are to assist in accommodating a transition by the utility from plan PP1 to plan PP2). The customer $c_x$ is selected at 602, from a plurality of electric utility customers C1, based on a previously-determined ranked order RO of the customers C1—e.g., where the ranked order RO is based on various flexibility metrics for the customers C1. For example, the customer $c_x$ is selected at 602 as the next most flexible customer (e.g., next most tolerant of more stringently constrained resource utilization) among those of customers C1 which have yet to be so selected.

Based on the selecting at 602, operations identify (at 603) a predicted demand metric $xr_{dx:2}$ which corresponds to the current customer $c_x$. For example, identifying the predicted demand metric $xr_{dx:2}$ includes performing a look-up, calculation or other processing to determine a next utilization constraint $uc_{x:2}$ to be imposed by customer $c_x$ during power delivery according to plan PP2. In such an embodiment, the predicted demand metric $xr_{dx:2}$ is equal to, or otherwise determined based on, this next utilization constraint $uc_{x:2}$.

Based on the predicted demand metric $xr_{dx:2}$, operations 600 determine (at 604) a predicted change $\Delta rd_x$ to a demand by the current customer $c_x$—e.g., where the change is expected to take place in response to the next utilization constraint $uc_{x:2}$ being imposed on customer $c_x$. The predicted change $\Delta rd_x$ is then added (at 605) to a sum $\Delta rd_{C2}$ of one or more other such predicted changes—if any—which have been calculated each for a respective other one of the one or more customers C2.

After the adding at 605, an evaluation is made (at 606) as to whether the sum $\Delta rd_{C2}$ is greater than or equal to the difference $\Delta r_s$ which is identified at 601. Where sum $\Delta rd_{C2}$ is determined at 605 to be less than the difference $\Delta r_s$ (indicating that the one or more customers C2 selected thus far are sufficient to accommodate the difference $\Delta r_s$), operations 600 proceed to the selection, at 602, of a next customer $c_x$ to be included in the one or more customers C2. Otherwise, operations 600 subsequently signal (at 607) that an identification of the selected one or more customers C2 is complete.

Figure 7:
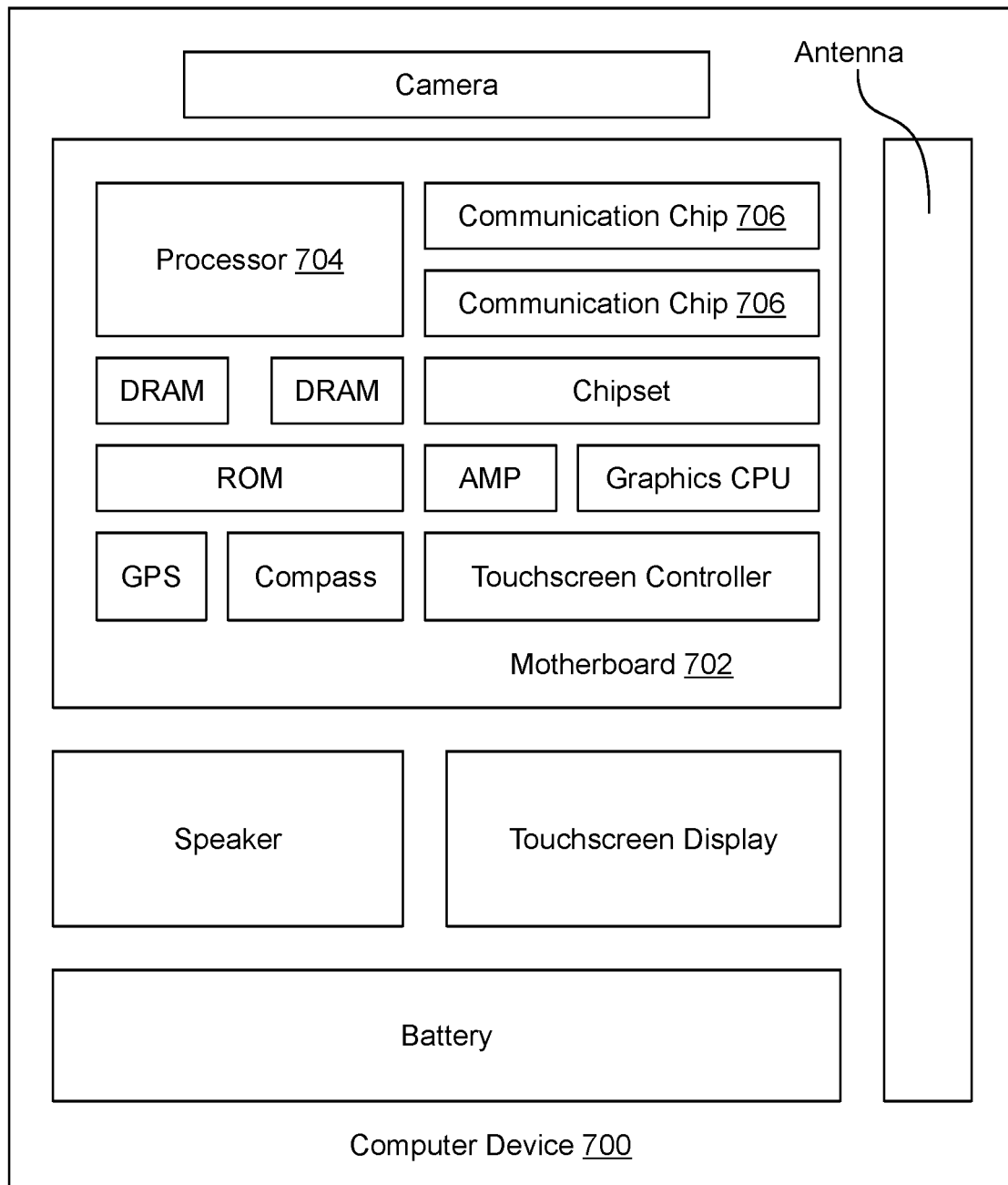
FIG. 7 is a functional block diagram illustrating a computing device in accordance with one embodiment.

FIG. 7 illustrates a computing device 700 in accordance with one embodiment. The computing device 700 houses a board 702. The board 702 may include a number of components, including but not limited to a processor 704 and at least one communication chip 706. The processor 704 is physically and electrically coupled to the board 702. In some implementations the at least one communication chip 706 is also physically and electrically coupled to the board 702. In further implementations, the communication chip 706 is part of the processor 704.

Depending on its applications, computing device 700 may include other components that may or may not be physically and electrically coupled to the board 702. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 706 enables wireless communications for the transfer of data to and from the computing device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 706 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 700 may include a plurality of communication chips 706. For instance, a first communication chip 706 may be dedicated to shorter range wireless communications such as Wi-Fi and Bluetooth and a second communication chip 706 may be dedicated to longer range wireless communications such as GPS, EDGE, GPRS, CDMA, WiMAX, LTE, Ev-DO, and others.

The processor 704 of the computing device 700 includes an integrated circuit die packaged within the processor 704. The term "processor" may refer to any device or portion of a device that processes electronic data from registers and/or memory to transform that electronic data into other electronic data that may be stored in registers and/or memory. The communication chip 706 also includes an integrated circuit die packaged within the communication chip 706.

In various implementations, the computing device 700 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 700 may be any other electronic device that processes data.

Some embodiments may be provided as a computer program product, or software, that may include a machine-readable medium having stored thereon instructions, which may be used to program a computer system (or other electronic devices) to perform a process according to an embodiment. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

Figure 8:
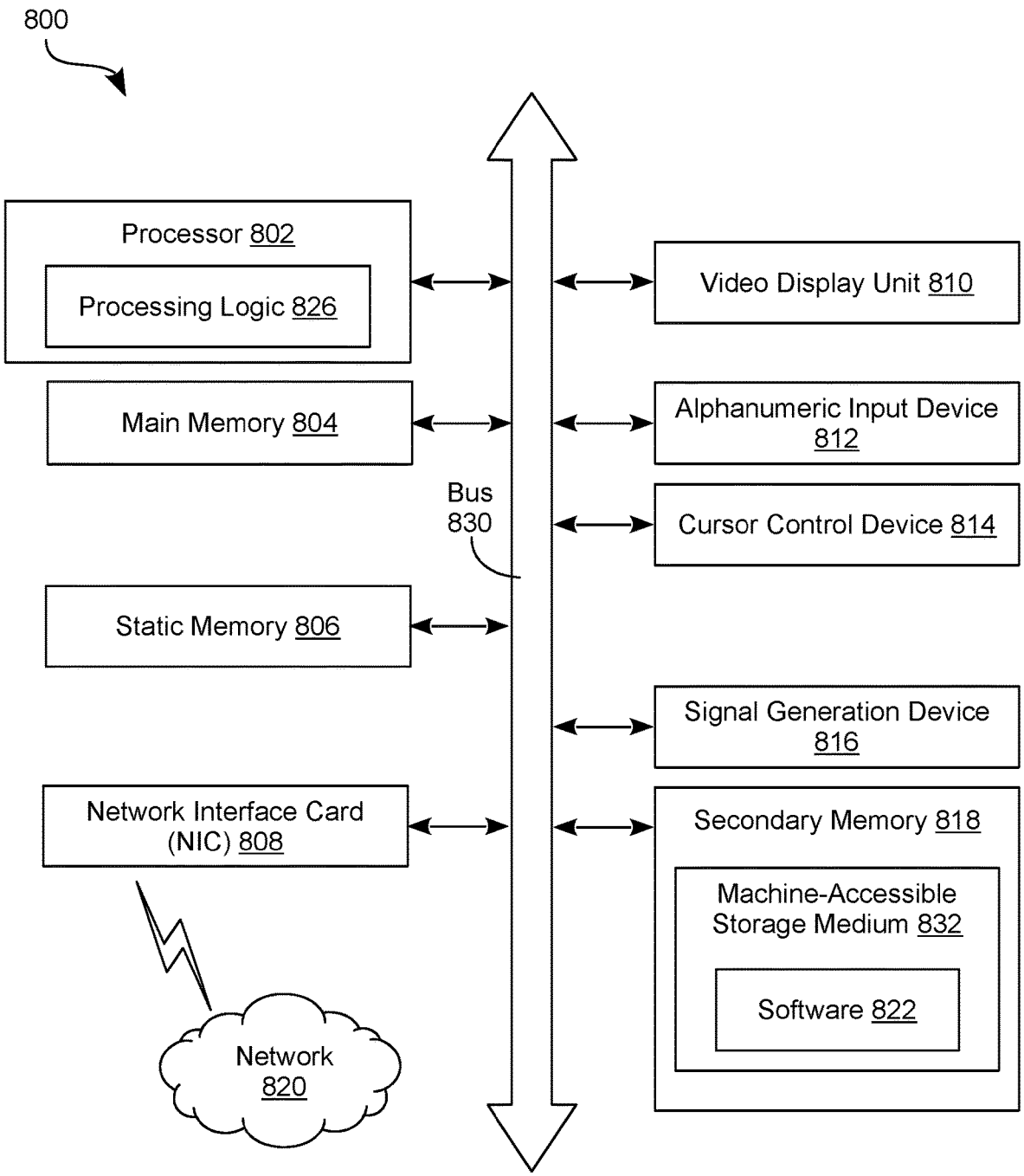
FIG. 8 is a functional block diagram illustrating an exemplary computer system, in accordance with one embodiment.

FIG. 8 illustrates a diagrammatic representation of a machine in the exemplary form of a computer system 800 within which a set of instructions, for causing the machine to perform any one or more of the methodologies described herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies described herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 818 (e.g., a data storage device), which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations described herein.

The computer system 800 may further include a network interface device 808. The computer system 800 also may include a video display unit 810 (e.g., a liquid crystal display (LCD), a light emitting diode display (LED), or a cathode ray tube (CRT)), an alphanumeric input device 812 (e.g., a keyboard), a cursor control device 814 (e.g., a mouse), and a signal generation device 816 (e.g., a speaker).

The secondary memory 818 may include a machine-accessible storage medium (or more specifically a computer-readable storage medium) 832 on which is stored one or more sets of instructions (e.g., software 822) embodying any one or more of the methodologies or functions described herein. The software 822 may also reside, completely or at least partially, within the main memory 804 and/or within the processor 802 during execution thereof by the computer system 800, the main memory 804 and the processor 802 also constituting machine-readable storage media. The software 822 may further be transmitted or received over a network 820 via the network interface device 808.

While the machine-accessible storage medium 832 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any of one or more embodiments. The term "machine-readable storage medium" shall accordingly be taken to include, but not be limited to, solid-state memories, and optical and magnetic media.

Techniques and architectures for managing power demand by a customer of a utility are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A device comprising:
   first circuitry to determine a ranked order of a plurality of customers of an electric utility, including the first circuitry to determine the ranked order based on a set F1 of flexibility metrics which each correspond to a respective customer of the plurality of customers, wherein, for each flexibility metric of the set F1, the flexibility metric indicates a difference between a respective resource utilization by the corresponding customer, and a constraint which is to be imposed on the respective resource utilization during a delivery of power by the electric utility according to a first plan; and
   second circuitry to identify one or more customers selected from the plurality of customers according to the ranked order, including the second circuitry to determine that a predicted contribution, to a first change to a resource demand metric, is sufficient to accommodate a second change to a resource supply metric, wherein the second change corresponds to a transition from the first plan to a second plan, wherein the predicted contribution is to be provided by the one or more customers, wherein the second circuitry to identify the one or more customers comprises the second circuitry to:
      identify a most flexible customer from among those of the plurality of customers which have yet to be selected as one of the one or more customers;
      select the most flexible customer to be one of the one or more customers;
      determine a predicted contribution value which corresponds to the customers which are currently selected to be among the one or more customers; and
      determine, based on the predicted contribution value and the second change to the resource supply metric, whether another customer is to be selected as one of the one or more customers.

2. The device of claim 1, further comprising:
   third circuitry, responsive to the second circuitry, to communicate, to each customer of the one or more customers, a respective constraint to be imposed on a respective resource utilization by the customer to accommodate the second plan.

3. The device of claim 1, wherein the set F1 comprises a first flexibility metric which is based on a ratio of a first number and a second number, wherein the first number is based on a metric of the respective resource utilization, and wherein the second number is based on the constraint imposed on the respective resource utilization.

4. The device of claim 1, further comprising:
   third circuitry which, during a delivery of power by the utility according to the second plan, is to:
      determine a set F2 of flexibility metrics which each correspond to a respective customer of the plurality of customers; and
      provide one of:
         an addition of a customer, according to the ranked order RO, to the one or more customers; or
         an update to the constraint to be imposed on the respective resource utilization by one of the one or more customers;
      responsive to a determination, based on the set F2, that an actual contribution, provided by the one or more customers to the change to the resource demand metric, is insufficient to accommodate the change to the resource supply metric.

5. The device of claim 1, wherein the set F1 comprises a first flexibility metric which corresponds to a first customer of the plurality of customers, wherein the first flexibility metric is calculated at the first customer.

6. The device of claim 1, further comprising:
   third circuitry to receive multiple flexibility metrics of the set F1, each from a different respective one of the plurality of customers, via a communication network.

7. The device of claim 6, wherein the third circuitry is to participate in network communications, according to a pre-determined schedule, to automatically retrieve the multiple flexibility metrics.

8. The device of claim 1, further comprising:
third circuitry which, for each plan of a sequence of multiple plans each to deliver power from the utility to the plurality of customers, is to:
determine a respective set of flexibility metrics which each correspond to a respective customer of the plurality of customers;
determine, based on the respective set of flexibility metrics, a respective ranked order of the plurality of customers; and
select a respective one or more customers, from the plurality of customers according to the respective ranked order, based on a predicted contribution to be provided by the respective one or more customers to accommodate the plan.

9. A computer-readable storage medium having stored thereon instructions which, when executed by one or more processing units, cause the one or more processing units to perform a method comprising:
determining a ranked order of a plurality of customers of an electric utility, including determining the ranked order based on a set F1 of flexibility metrics which each correspond to a respective customer of the plurality of customers, wherein, for each flexibility metric of the set F1, the flexibility metric indicates a difference between a respective resource utilization by the corresponding customer, and a constraint which is to be imposed on the respective resource utilization during a delivery of power by the electric utility according to a first plan; and
identifying one or more customers selected from the plurality of customers according to the ranked order, including determining that a predicted contribution, to a first change to a resource demand metric, is sufficient to accommodate a second change to a resource supply metric, wherein the second change corresponds to a transition from the first plan to a second plan, wherein the predicted contribution is to be provided by the one or more customers,
wherein identifying the one or more customers comprises:
identifying a most flexible customer from among those of the plurality of customers which have yet to be selected as one of the one or more customers;
selecting the most flexible customer to be one of the one or more customers;
determining a predicted contribution value which corresponds to the customers which are currently selected to be among the one or more customers; and
determining, based on the predicted contribution value and the second change to the resource supply metric, whether another customer is to be selected as one of the one or more customers.

10. The computer-readable storage medium of claim 9, the method further comprising:
communicating, to each customer of the one or more customers, a respective constraint to be imposed on a respective resource utilization by the customer to accommodate the second plan.

11. The computer-readable storage medium of claim 9, wherein the set F1 comprises a first flexibility metric which is based on a ratio of a first number and a second number, wherein the first number is based on a metric of the respective resource utilization, and wherein the second number is based on the constraint imposed on the respective resource utilization.

12. The computer-readable storage medium of claim 9, the method further comprising:
receiving multiple flexibility metrics of the set F1, each from a different respective one of the plurality of customers, via a communication network.

13. The computer-readable storage medium of claim 12, wherein receiving the multiple flexibility metrics comprises participating in network communications, according to a pre-determined schedule, to automatically retrieve the multiple flexibility metrics.

14. The computer-readable storage medium of claim 9, the method further comprising:
for each plan of a sequence of multiple plans each to deliver power from the utility to the plurality of customers:
determining a respective set of flexibility metrics which each correspond to a respective customer of the plurality of customers;
determining, based on the respective set of flexibility metrics, a respective ranked order of the plurality of customers; and
selecting a respective one or more customers, from the plurality of customers according to the respective ranked order, based on a predicted contribution to be provided by the respective one or more customers to accommodate the plan.

15. A system comprising:
a memory; and
a processor coupled to the memory, the processor comprising:
first circuitry to determine a ranked order of a plurality of customers of an electric utility, including the first circuitry to determine the ranked order based on a set F1 of flexibility metrics which each correspond to a respective customer of the plurality of customers, wherein, for each flexibility metric of the set F1, the flexibility metric indicates a difference between a respective resource utilization by the corresponding customer, and a constraint which is to be imposed on the respective resource utilization during a delivery of power by the electric utility according to a first plan; and
second circuitry to identify one or more customers selected from the plurality of customers according to the ranked order, including the second circuitry to determine that a predicted contribution, to a first change to a resource demand metric, is sufficient to accommodate a second change to a resource supply metric, wherein the second change corresponds to a transition from the first plan to a second plan, wherein the predicted contribution is to be provided by the one or more customers, wherein the second circuitry to identify the one or more customers comprises the second circuitry to:
identify a most flexible customer from among those of the plurality of customers which have yet to be selected as one of the one or more customers;

select the most flexible customer to be one of the one or more customers:

determine a predicted contribution value which corresponds to the customers which are currently selected to be among the one or more customers; and determine, based on the predicted contribution value and the second change to the resource supply metric, whether another customer is to be selected as one of the one or more customers.

16. The system of claim 15, the processor further comprising:

third circuitry, responsive to the second circuitry, to communicate, to each customer of the one or more customers, a respective constraint to be imposed on a respective resource utilization by the customer to accommodate the second plan.

17. The system of claim 15, wherein the set F1 comprises a first flexibility metric which is based on a ratio of a first number and a second number, wherein the first number is based on a metric of the respective resource utilization, and wherein the second number is based on the constraint imposed on the respective resource utilization.

18. The system of claim 15, the processor further comprising:

third circuitry which, during a delivery of power by the utility according to the second plan, is to:

determine a set F2 of flexibility metrics which each correspond to a respective customer of the plurality of customers; and provide one of:

an addition of a customer, according to the ranked order RO, to the one or more customers; or an update to the constraint to be imposed on the respective resource utilization by one of the one or more customers;

responsive to a determination, based on the set F2, that an actual contribution, provided by the one or more customers to the change to the resource demand metric, is insufficient to accommodate the change to the resource supply metric.

19. The system of claim 15, wherein the set F1 comprises a first flexibility metric which corresponds to a first customer of the plurality of customers, wherein the first flexibility metric is calculated at the first customer.

* * * * *